United States Patent [19]

Jensen

[11] Patent Number: 4,785,047

[45] Date of Patent: Nov. 15, 1988

[54] METHOD FOR PREPARING CLEAR POLYORGANOSILOXANE ELASTOMERS

[75] Inventor: Jary D. Jensen, Midland, Mich.

[73] Assignee: Dow Corning Corporation, Midland, Mich.

[21] Appl. No.: 79,555

[22] Filed: Jul. 30, 1987

[51] Int. Cl.[4] .......................... C08K 5/54; C08K 3/36; C08L 83/04

[52] U.S. Cl. ................... 524/714; 524/262; 524/263; 524/588; 524/860; 524/865; 524/866; 524/861; 524/862

[58] Field of Search ............... 524/862, 861, 860, 865, 524/866, 588, 262, 263, 714

[56] References Cited

U.S. PATENT DOCUMENTS

| | | | |
|---|---|---|---|
| 2,786,042 | 3/1957 | Iler | 260/37 |
| 3,624,023 | 11/1971 | Hartlage | 260/375 B |
| 3,957,713 | 5/1976 | Jeram | 524/862 |
| 3,996,189 | 12/1976 | Travnicek | 260/375 B |
| 4,008,198 | 2/1977 | Krohberger et al. | 260/375 B |
| 4,418,165 | 11/1983 | Polmanteer et al. | 523/210 |

FOREIGN PATENT DOCUMENTS 55-56154  4/1980  Japan ................................. 524/860

*Primary Examiner*—C. Warren Ivy
*Attorney, Agent, or Firm*—Robert Spector

[57] ABSTRACT

Compositions yielding optically clear silicone elastomers are obtained by preparing a homogeneous mixture comprising a liquid polydiorganosiloxane containing at least two vinyl or other ethylenically unsaturated radicals per molecule and a finely divided silica filler treated with a hexaorganodisilazane and then adding additional hexaorganodisilazane in an amount equal to at least 5 percent of filler weight. The blending is preferably carried out using a high rate of shear and volatile materials are removed by heating the composition under reduced pressure.

10 Claims, No Drawings

METHOD FOR PREPARING CLEAR POLYORGANOSILOXANE ELASTOMERS

BACKGROUND OF THE INVENTION

1. Field of the Invention

This invention relates to polyorganosiloxane elastomers. More particularly this application relates to a method for preparing optically clear polyorganosiloxane elastomers.

2. Description of the Prior Art

Polyorganosiloxane elastomers, which are also referred to in the art as silicone rubbers, exhibit many desirable properties that make these materials suitable for a variety of end use applications. The elastomers are prepared by curing compositions ranging in consistency from pourable liquids to gums. Liquid or pumpable compositions are particularly desirable because they can be fabricated by injection molding.

Some end use applications of polyorganosiloxane elastomers require that the cured elastomer contain a reinforcing filler such as silica, yet be optically clear. Unfilled polyorganosiloxane elastomers are transparent and substantially free of haze, however the physical properties of the cured materials are relatively poor.

When a reinforcing filler such as finely divided silica is added to a curable polyorganosiloxane composition the filler is usually treated with a low molecular weight hydroxyl-containing silane, siloxane or a hexaorganodisilazane to prevent a phenomenon known as crepe aging or structuring. Irrespective of the method used to treat the filler, its presence may decrease the optical transparency and increases the optical haze of the cured elastomer to the extent that the elastomer is not considered optically clear.

Methods for preparing optically clear polyorganosiloxane elastomers containing a treated reinforcing filler are disclosed in the prior art. One of these methods involves using a filler of sufficiently small particle size that light rays passing through the cured elastomer are not refracted even when the refractive indices of the cured organosiloxane reactants do not match those of the silica filler. Methods for preparing silica fillers within this particle size range are described in U.S. Pat. No. 4,418,165, which issued to Polmanteer and Chapman on Nov. 29, 1983 and in U.S. Pat. No. 2,786,042, which issued to Iler on Mar. 19, 1957.

Optically clear cured silicone elastomers can be obtained using commercially available grades of fume silica or other finely divided silicas that are treated with anti-crepe agents if the refractive indices of the durable polyorganosiloxane(s) and the treated filler are substantially equal. This can be accomplished by either selecting polyorganosiloxane reactants to yield a cured elastomer of substantially the same refractive index as the filler or by treating the silica or other filler to alter its refractive index to match that of the cured elastomer.

For example, it has been found that the refractive indices of organosiloxane copolymers containing dimethylsiloxane and phenylmethylsiloxane units are essentially the same as the refractive index of silica. Other silicon bonded hydrocarbon radicals such as trifluoropropyl can be included in the polymer if adjustments are made to match the refractive indices of the base polymer and the filler. This approach to obtaining optically clear elastomers is less than desirable because it limits the types of polyorganosiloxanes that can be included in a curable composition.

As an alternative to modifying the structure of the polyorganosiloxane, one can use specified classes of silica treating agents such as are disclosed in U.S. Pat. No. 3,996,189 which issued to Travnicek on Dec. 7, 1976, and in U.S. Pat. No. 3,624,023, which issued to Hartlage on Nov. 30, 1971.

In U.S. Pat. No. 4,008,198, which issued on Feb. 15, 1977, Krohberger et al. teach preparing highly transparent or optically clear polyorganosiloxane elastomers by blending together viscous polydiorganosiloxane with (1) at least 0.02 percent by weight, based on the polydiorganosiloxane, of a nitrogen compound having at least one triorganosilyl group wherein the silicon atom is bonded to nitrogen directly or through an oxygen atom and no more than one triorganosilyl group per molecule is bonded directly to nitrogen, (2) from 4 to 40 percent by weight, based on the polydiorganosiloxane, of a hexaorganodisilazane, and (3) from 10 to 150 percent by weight. based on the polydiorganosiloxane, of a silicon dioxide having a surface area of at least 50 m$^2$/gram.

The examples of this patent report that an elastomer prepared by curing a polydimethylsiloxane containing 0.07 mole % of methylvinylsiloxane units exhibits a light transparency value of 91%. The transparency value is reduced to 84% when a hydroxyl terminated polydimethylsiloxane is substituted for hexamethyldisilazane.

By comparison, a composition prepared using a silazane treated filler and a polydimethylsiloxane containing 5.5 mole percent of diphenylsiloxane units and about 0.5 mole % of methylvinylsiloxane units exhibits a light transparency value of 96%. This is consistent with the prior art technique of improving optical clarity by matching the refractive indices of the filler and the polydiorganosiloxane. No haze values are reported for any of the exemplified compositions.

Krohberger et al. require both the aforementioned nitrogen compound containing at least one triorganosilyl group and a hexaorganodisilazane to achieve both dimensional stability and optical transparency in the uncured composition. There are no data to indicate whether both compounds are required to achieve a high level of optical transparency.

The compositions disclosed in the aforementioned Krohberger et al. patent are prepared by mixing the polydiorganosiloxane, silica treating agents and water in a kneader. After an unspecified time period the silica is added. Mixing is continued until the composition becomes homogeneous, at which time the composition is heated at a temperature of 150° C under a pressure of 1 mm. of mercury until there is no evidence of nitrogen compounds being evolved.

The present inventor was unable to prepare optically clear cured silicone elastomers by following the preparative method exemplified by Krohberger et al. using compositions containing a polydimethylsiloxane as the curable polymer in combination with fume silica and hexamethyldisilazane as the silica treating agent within the concentration range taught by Krohberger et al. The haze value of the cured elastomer was over 40%.

An objective of the present invention is to provide a method for preparing optically clear cured elastomers from compositions containing a polydimethylsiloxane as the curable polymer and a treated reinforcing silica filler wherein at least a portion of the silica treating agent is hexamethyldisilazane or other compatible hexaorganodisilazane.

SUMMARY OF THE INVENTION

In accordance with the method of this invention, compositions yielding optically clear silicone elastomers are prepared by (1) blending to homogeniety a mixture comprising a liquid polydimethylsiloxane, a reinforcing silica filler and a compatible hexaorganodisilazane, and (2) subsequently blending an additional quantity of said hexaorganodisilazane in an amount equal to at least 5 percent of filler weight, where the total amount of said hexaorganodisilazane is equivalent from 30 to 65 percent by weight, based on the weight of filler. In a preferred embodiment of the present method the viscosity of the composition is from 200 to 1000 Pa.s and it is prepared in a high shear mixer.

DETAILED DESCRIPTION OF THE INVENTION

This invention provides a method for preparing an optically clear, organosiloxane composition, said method comprising the steps of I. preparing a first mixture comprising at least one polydiorganosiloxane, from 10 to 100 percent by weight, based on the weight of said polydiorganosiloxane, of an untreated reinforcing silica filler, and as a filler treating agent, at least 15 percent by weight, based on the weight of said filler, of a hexaorganodisilazane that is miscible with said polydiorganosiloxane;

II. blending said first mixture to homogeniety with at least 5 percent by weight, based on the weight of said filler, of said hexaorganodisilazane to form a second mixture, where the total weight of hexaorganodisilazane used to treat said filler is at least 30 percent of the weight of said filler; and III. heating said second mixture under reduced pressure to remove volatile materials and form said organosiloxane composition.

In accordance with the present method treatment of the filler with the hexaorganodisilazane must occur in the presence of least the polydiorganosiloxane ingredient of the present curable compositions. It has been found that the improvement in transparency and haze is not observed if the silica is treated before being blended with the other ingredients of the organosiloxane composition.

The features that characterize the present method are the use of a hexaorganodisilazane as the silica treating agent and the addition of at least 5 weight percent, based on filler weight, of this treating agent during the second step of the present method, after all of the silica has been added.

In accordance with prior art methods for preparing curable polyorganosiloxane compositions containing a treated reinforcing silica filler, the filler is either treated prior to being blended with the other ingredients of a curable organosiloxane composition or the filler is treated in-situ by adding all of the treating agent either prior to or during addition of the filler. The former alternative is exemplified in the aforementioned patent issued to Krohberger et al.

The ingredients used in the present method and the individual steps of the method will now be described in detail.

1. The Silica Treating Agent

The organosilicon compounds used to treat the silica in accordance with the method of this invention are hexaorganodisilazanes corresponding to the general formula

$R_3SiN(H)SiR_3$ where each R represents a monovalent hydrocarbon radical or a substituted monovalent hydrocarbon radical, and R contains from 1 to 20 carbon atoms. The six radicals represented by R can be identical or different. To achieve the complete miscibility of the silica treating agent with the other organosilicon ingredients, particularly the polydiorganosiloxane, a majority of the R radicals should be members of the same class of hydrocarbon radicals, i.e. alkyl, as the major portion of the hydrocarbon radicals present on the polydiorganosiloxane ingredient. For example, if the polydiorganosiloxane is the preferred polydimethylsiloxane R represents a lower alkyl radical, most preferably methyl.

It will be understood by those skilled in the art that when the more than about 30 mole percent of the hydrocarbon radicals present on the polydiorganosiloxane ingredient of the present compositions are other than methyl, such as 3,3,3-trifluoropropyl, at least a portion of the R radicals on the silica treating agent should be selected from this same class of hydrocarbon radicals, in this instance fluoroalkyl radicals, to ensure miscibility of the silica treating agent with the polydiorganosiloxane.

The total weight of filler treating agent used in the present method is at least 30 weight percent, based on the weight of silica. Less than this amount will typically not yield optically clear materials exhibiting substantially no refraction of visible light. The most efficacious amount of treating agent for a given polyorganosiloxane composition is determined by a number of factors. the most influential of which appears to be the particle size of the filler. It will be understood that the minimum amount of treating agent required to prepare a processable composition is usually directly proportional to the surface area of the filler particles, which is, in turn a function of the particle size of the filler.

Using more than about 50 percent by weight of hexaorganodisilazane is uneconomical, since any treating agent that does not react with the filler is lost when the composition is subsequently heated under reduced pressue to remove volatile materials. The amount of treating agent is preferably from 40 to 55 weight percent, based on the weight of the silica filler.

In accordance with the present method at least 5 percent by weight of hexaorganodisilazane, based on filler weight is added to the composition after all of the filler has been added. If less than this amount of treating agent is added following completion of the filler addition, the cured elastomer will not have the desired optical clarity. The optimum amount of treating agent required for the second step of the present method will be dependent on the particular composition, and can readily be determined with a minimum of experimentation by operating within the limits defined hereinabove.

On the other hand, if insufficient treating agent is present during initial treating of the filler it will be difficult to homogeneously incorporate the filler into the polydiorganosiloxane. The viscosity of the composition may increase to the extent that it is no longer processable. This phenomenon has been referred to hereinbefore as "creping" or "crepe hardening". Typically at least 15 percent by weight of treating agent, based on the weight of filler, should be added prior to or during addition of the filler to prevent creping.

One or more hexaorganodisilazanes can be used as the sole filler treating agent during the initial treatment step, or these compounds can be combined with other conventional filler treating agents, including liquid silanol and low molecular Weight hydroxyl terminated polydiorganosiloxanes wherein the silicon-bonded hydrocarbon radicals are typically lower alkyl such as methyl, haloalkyl such as 3,3,3-trifluoropropyl, alkenyl such as vinyl, or aryl such as phenyl. Preferred auxiliary treating agents for compositions containing at least one polydimethylsiloxane include hydroxyl terminated dimethylsiloxane/methylvinylsiloxane copolymers because these treating agents have been shown to improve the tensile strength and other physical properties of cured elastomers prepared using the present filler treating method.

2. The Polydiorganosiloxane

The polydiorganosiloxanes that are blended with a finely divided silica and the treating agents described hereinbefore contain repeating units of the formula R 2SiO where R represents identical or different monovalent hydrocarbon radicals or substituted monovalent hydrocarbon radicals and the substituent is preferably halogen. Depending upon the number of repeating units present, the polydiorganosiloxane can be a liquid, a semi-solid paste or a gum.

Because compositions prepared using the present method are typically curable to form elastomeric or resinous materials, the polydiorganosiloxane contains at least two groups per molecule that will react with a curing agent such an organic peroxide or an organohydrogensiloxane.

A preferred class of polydiorganosiloxanes includes liquid polydiorganosiloxanes containing at least two vinyl or other ethylenically unsaturated hydrocarbon radical per molecule. These polymers are cured by reacting them with an organohydrogensiloxane in the presence of a platinum-containing catalyst. Preferably the ethylenically unsaturated hydrocarbon radicals are vinyl and are located at the terminal positions of the molecule.

This preferred class of polydiorganosiloxanes can be represented by the average general formula

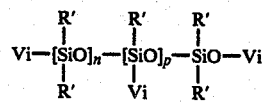

where R' represents a monovalent hydrocarbon radical or a substituted monovalent hydrocarbon radical. Vi represents a vinyl radical, the sum of n and p represents a degree of polymerization equivalent to a viscosity of from 1 to about 50 Pa.s at 25° C. and p represents a value such that p/(n+p) is equal to from 0.0 to 0.005.

Expressed another way, organovinylsiloxane units represent from 0 to 5 percent of the repeating units present in the polydimethylsiloxane.

Most preferably R in the foregoing formula represents a methyl radical or combination of at least 50 mole percent of methyl radicals with the remainder being either 3,3,3-trifluoropropyl radicals of a combination of methyl or phenyl radicals.

The polydiorganosiloxane ingredient can include only one type of polymer. Alternatively two or more polydiorganosiloxanes of different molecular weights can be present. The present inventor has found that the physical properties of the cured elastomer, particularly resiliency and tear strength, are improved by using a combination of high and low molecular weight polydiorganosiloxanes. In preferred embodiments the low molecular weight species exhibits a viscosity of from about 0.1 to about 3 Pa.s at 25° C. and the high molecular weight species exhibits a viscosity of from 45 to about 65 Pa.s at 25° C.

While not willing to be bound by any theory, the improvement in physical properties observed using the preferred polydiorganosiloxane compositions described hereinabove is believed to result from a variation in crosslink density within the cured elastomer.

3. The Silica Filler

Any finely divided form of silica can be used as the reinforcing filler that is treated in accordance with the present method. Colloidal silicas are preferred because of their relatively high surface area, which is typically at least 50 square meters per gram. Fillers having surface areas of at least 300 square meters per gram are preferred for use in the present method. Colloidal silicas can be prepared by precipitation or a fume process. Both of these preferred types of silica are commercially available.

The amount of finely divided silica used in compositions prepared in accordance with the present method is at least in part dependent upon the physical properties desired in the cured elastomer. Liquid or pumpable polyorganosiloxane compositions typically contain from about 10 to about 100 percent by weight of silica, based on the weight of polydiorganosiloxane. This value is preferably from about 20 to about 50 percent.

4. Optional Ingredients

In addition to the polydiorganosiloxane, silica filler and filler treating agent(s), polyorganosiloxane compositions prepared using the present method can contain one or more additives that are conventionally present in curable compositions of this type. These materials are added to impart or enhance certain properties of the cured elastomer or facilitate processing of the curable composition. A small amount of water can be added together with the silica treating agent(s) as a processing aid.

Typical additives include but are not limited to pigments, dyes, adhesion promoters, flame retardants, heat and/or ultraviolet light stabilizers and resinous organosiloxane copolymers to enhance the physical properties of the cured elastomer.

A preferred type of resinous copolymer contains repeating units of the general formula $SiO_{4/2}$ in addition to triorganosiloxy units of the general formulae $R''_3SiO_{\frac{1}{2}}$ and diorganovinylsiloxy units of the general formula $CH_2=CH(R''')^2SiO_{\frac{1}{2}}$. In these formulae R" and R'" are individually monovalent hydrocarbon or halohydrocarbon radicals containing from 1 to about 20 carbon atoms, as previously defined for the R radicals of the polydiorganosiloxane ingredient, and both R" and R'" are free of ethylenic unsaturation.

The molar ratio of the combination of triorganosiloxy units and diorganovinylsiloxy units to $SiO_{4/2}$ units in the resinous copolymer is from 0.7 to 1.2, inclusive. The vinyl-containing units constitute from 2 to 8 percent by weight of the copolymer, which preferably contains at least two vinyl radicals per molecule. In preferred embodiments of the copolymer the ranges for the molar ratio of diorganovinylsiloxy: triorganosiloxy:$SiO_{4/2}$ units is 0.08–0.1 : 0.06–1 : 1.

The resinous copolymers can be prepared as described in U.S. Pat. No. 2,676,182, which issued to Daudt and Tyler on Apr. 20, 1954 and is hereby incorporated in this specification by reference thereto. The copolymers described in this patent contain from 2 to 23 percent by weight of hydroxyl groups, which is considerably above the maximum level of about 0.8 weight percent preferred for precursors of the present copolymers. The hydroxyl content of the precursor can be conveniently reduced to the desired level by employing a higher concentration of triorganosiloxane capping agent than the concentration range taught by Daudt et al.

Briefly, the method of Daudt et al. comprises reacting a silica hydrosol under acidic conditions with the appropriate amount of hexamethyldisiloxane or trimethylchlorosilane. The resinous copolymers used to prepare the present elastomers can be obtained by reacting Daudt et al's. product with the required amount of a hexaorganodisilazane or a hexaorganodisiloxane wherein each silicon atom contains a vinyl radical and two methyl or other hydrocarbon radicals represented by R" in the foregoing formula.

To ensure compatibility of the reactants and transparency of the cured polyorganosiloxane elastomer it is preferable that the silicon bonded hydrocarbon radicals present on the polydiorganosilxane, resinous polyorganosiloxane copolymer and any other organosilicon compounds present in the composition be identical. Most preferably these hydrocarbon radicals are methyl, or combinations of methyl and phenyl or methyl and 3,3,3-trifluoropropyl.

5. Preparation of the Present Compositions

In accordance with the present method the polydiorganosiloxane(s) and the silica filler together with any other additives and/or processing aids and a portion of the hexaorganodisilazane treating agent are blended until the filler is completely treated and uniformly dispersed throughout the composition to form a homogeneous material. The composition of a typical homogeneous material will not vary significantly when sampled at random locations throughout the material. This blending operation can require anywhere from 15 minutes to 2 hours, depending upon the amount of material being processed, the viscosity of the material and the shear rate to which the material is subjected during processing.

As discussed hereinabove, the inventive feature of the present method resides in adding at least 5 weight percent of the hexaorganodisilazane, based on filler weight, after all of the filler has been added to the composition.

The weight of hexaorganodisilazane used in the first step of the present method is equivalent to at least 10 percent of weight of the silica. Blending of the ingredients is conducted in a suitable mixing apparatus. Any of the auxiliary silica treating agents discussed in the preceding paragraphs of this specification are typically added during or shortly following addition of the polydiorganosiloxane.

The first step of the present method can be conducted at temperatures from ambient to about 200° C. using any of the mixing equipment typically employed for processing polyorganosiloxane compositions.

In a preferred embodiment of the present method the mixing equipment is capable of subjecting the composition to a high rate of shear. The advantage of using this type of a "high intensity" mixer to prepare silica filled polyorganosiloxane compositions is taught in U.S. Pat. No. 3,690,804, which issued to Minuto on June 1. 1976. In accordance with the disclosure of this patent, the tip of the stirring device in the mixer is rotated at a speed of from 25 to about 250 feet per second, which would generate considerable shearing forces. The exemplified compositions are blended in a Henschel high intensity mixer wherein the rotor was operated at a speed of 3800 revolutions per minute, equivalent to a rotor tip speed of 157 feet per second.

Dough type mixers equipped with "sigma" shape blades, which are often used to process organosiloxane elastomer compositions, can be used, but because of their lower efficiency are not as desireable as mixers wherein the mixing surfaces are of a relatively flat "paddle" configuration. Examples of the paddle type mixers include the Henschel mixer disclosed in the aforementioned Minuto patent and certain mixers manufactured by Neulinger A. G. The blade of the mixer is preferably rotated at a speed of at least 100 revolutions per minute.

During the second step of the present method the composition resulting from the initial filler treatment is blended with at least 5 percent by weight of a compatible hexaorganodisilazane, based on filler weight. Blending of the ingredients is continued while the composition is heated at temperatures from about 100 to 250° C. under reduced pressure to complete treatment of the silica, remove volatile materials and obtain a curable composition of this invention.

Preparation of Cured Elastomers

Compositions prepared in accordance with the present method are typically converted to elastomeric or resinous materials using any of the known methods for curing polyorganosiloxane compositions. These methods include the use of organic peroxides that decompose upon heating and the use of moisture-activated curing agents such as triacetoxysilanes or other organosilicon compounds having three or more functional groups per molecule that hydrolyze in the presence of atmospheric moisture to form hydroxyl groups. When these moisture activated curing agents are used the polydiorganosiloxane ingredient of the present compositions contains at least two silicon-bonded hydroxyl groups.

A preferred method for curing the organosiloxane compositions prepared in accordance with the present method involves the platinum-catalyzed reaction of a polydiorganosiloxane, most preferably a polydimethylsiloxane, containing at least two vinyl radicals per molecule with an organohydrogensiloxane containing at least three silicon bonded hydrogen atoms per molecule. The amount of organohydrogensiloxane is sufficient to cure said polydiorganosiloxane.

In accordance with this preferred curing method, a polydimethylsiloxane containing at least two vinyl radicals per molecule is reacted with an organohydrogensiloxane containing at least three silicon bonded hydrogen atoms per molecule in the presence of a catalyst that is a metal selected from the platinum group of the periodic table or a compound of such a metal.

The organohydrogensiloxane contains from as few as four silicon atoms per molecule up to an average of 20 or more, and can have a viscosity of up to 10 Pa.s or higher at 25° C. The repeating units of this ingredient include but are not limited to $HSiO_{1.5}$, $R*HSiO$ and/or $R*_2HSiO_{0.5}$ in addition to one or more of monoorganosiloxy, diorganosiloxane, triorganosiloxy and $SiO_{4/2}$ units. In these formulae $R*$ is a monovalent hydrocarbon or halocarbon radical. To prepare an optically clear composition the organohydrogensiloxane should be compatible with the vinyl-containing polydimethylsiloxane, as determined by the ability of these two compounds to form a clear, homogeneous mixture. To achieve this compatibility it is preferable that the radical represented by $R*$ represent lower alkyl, most preferably methyl.

The molecules of organohydrogensiloxane can be linear, cyclic or a combination thereof and preferably contain diorganosiloxane and organohydrogensiloxane units. Alternatively the organohydrogensiloxane can consist in part or entirely of a compound of the formula $Si(OSiR*)_4$.

Most preferably $R*$ is methyl and the curing agent is a linear trimethylsiloxy terminated dimethylsiloxane/methylhydrogensiloxane copolymer containing an average of from 10 to about 50 repeating units per molecule, of which from 3 to 5 are methylhydrogensiloxane.

The molar ratio of vinyl or other ethylenically unsaturated hydrocarbon radicals to silicon bonded hydrogen atoms in compositions curable by a hydrosilation reaction is critical with respect to the properties of the cured elastomer. The optimum ratio for these types of curable compositions will be determined at least in part by the molecular weight of the polydiorganosiloxane(s), the type of curing agent and the concentration of any resinous vinyl-containing organosiloxane copolymer. This optimum value can readily be determined by those skilled in the art with a minimum of experimentation, and does not form part of this invention. To ensure complete curing it is preferable that the composition contain a stoichiometric excess of either vinyl radicals or silicon-bonded hydrogen atoms.

The catalyst for the hydrosilation reaction is a platinum group metal or a compound of such a metal. Platinum compounds such as hexachloroplatinic acid, and particularly complexes of these compounds with relatively low molecular weight vinyl-containing organosiloxane compounds are preferred catalysts because of their high activity and compatibility with the organosiloxane reactants. These complexes are described in U.S. Pat. No. 3,419,593 that issued to David N. Willing on Dec. 31, 1968. Complexes with low molecular weight organosiloxanes wherein the silicon bonded hydrocarbon radicals are vinyl and either methyl or 3,3,3-trifluoropropyl are particularly preferred because of their ability to catalyze a rapid curing of the elastomer at temperatures of at least about 70° C.

The platinum containing catalyst can be present in an amount equivalent to as little as one part by weight of platinum per one million parts of curable composition. Catalyst concentrations equivalent to from 5 to 50 parts of platinum per million of curable composition are preferred to achieve a practical curing rate. Higher concentrations of platinum provide only marginal improvements in curing rate, and are therefore economically unattractive, particularly when the preferred catalysts are used.

Mixtures of the aforementioned vinyl-containing reactants, curing agents and platinum-containing catalysts may begin to cure at ambient temperature. To increase the storage stability of these compositions or obtain a longer working time or "pot life", the activity of the catalyst under ambient conditions can be retarded or suppressed by addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of a platinum-containing catalyst at 25° C. Compositions containing these catalysts typically require heating at temperatures of 70° C. or above to cure at a practical rate.

If it desired to increase the pot life of a curable composition under ambient conditions, this can be accomplished using an olefinically substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

6. Properties of the Curable Composition and Cured Elastomer

Compositions prepared using the present method typically exhibit viscosities of about 0,5 up to about 10,000 or more Pa.s at 25° C. and vary in consistency from liquids to extrudable pastes to high viscosity gums.

To facilitate blending and transfer of pumpable compositions and minimize entrapment of air during mixing a viscosity of less than about 10 Pa.s at 25° C. is preferred.

Elastomers and resins obtained by curing silica filled polyorganosiloxane compositions prepared in accordance with the present method are sufficiently low in haze to be considered optically clear. The haze values of the cured elastomers are typically below 30 percent. Instruments for measuring haze are commercially available, and include the model XL211 Hazeguard, manufactured by the Gardner Neotech Division of Pacific Scientific Corporation.

Curable compositions prepared using the present method can be fabricated to form shaped articles by extrusion, molding, casting or any other technique conventionally used to process curable polyorganosiloxane compositions. Depending upon the type and concentration of curing agent the cured materials will vary from relatively soft gel-like elastomers to hard resinous materials. The cured materials are particularly suitable materials for the light transmitting portion of optical waveguides and other devices where a combination of optical clarity with high tensile and tear strength are desired.

The optical clarity of a sample is a function of two variables, the ability of the sample to transmit incident light in the visible spectrum and to do so without a significant amount of refraction of the light rays within the sample. The latter property can be measured as haze.

The following examples disclose preferred embodiments of the present method for preparing polyorganosiloxane compositions, and should not be interpreted as limiting the scope of the present invention defined in the accompanying claims. All parts and percentages are by weight unless otherwise specified and all properties were measured at a temperature of 25° C.

EXAMPLE 1

Three curable polyorganosiloxane compositions (two representative of the present method and one for comparative purposes) were prepared using 74 parts of a first dimethylvinylsiloxy terminated polydimethylsiloxane exhibiting a viscosity of about 5 Pa.s (A), 26 parts of a second dimethylvinylsiloxy terminated polydimethylsiloxane exhibiting a viscosity of about 0.4 Pa.s (B), 1.9 parts of water, and 35 parts of a fume silica filler (type S-17 supplied by Cabot Corporation). The silica treating agents consisted of 1.2 parts of a hydroxyl terminated dimethylsiloxane/methylvinylsiloxane copolymer containing about 10 weight percent of vinyl radical and about 16 weight percent of hydroxyl radical (C), and 15 parts of hexamethyldisilazane listed in the accompanying Table I. For the control all of the hexamethyldisilazane was added as one portion prior to the silica addition, while for the two samples demonstrating the present method 12 parts and 9 parts of hexamethyldisilazane were added prior to the silica addition and the remainder added following the silica addition.

The compositions were prepared by combining 46 parts of ingredient (A), all of ingredients (C) and (D), all of the water, and the amount of ingredient (E) shown in the following Table I under "1st addition" in a dough type mixer and blending the resultant composition to homogeniety under ambient conditions, which required about 30 minutes. At this time all of the fume silica was added and blended into the mixture, followed by the amount of ingredient (E) shown in the following Table I under "2nd addition". The resultant composition was blended for one hour while the jacket of the mixer was heated to a temperature of 150° C. and the chamber of the mixer was maintained under a reduced pressure of 20.3 kPa. At the end of the heating cycle 28 parts of (A) and 26 parts of (B) were added, and the composition was then blended in the mixer for an additional hour under ambient conditions.

The resultant composition was cooled an divided into two equal parts. One of the parts was combined with 2.66 parts of a trimethylsiloxy endblocked polyorganosiloxane having an average of five methylhydrogensiloxane units and three dimethylsiloxane units per molecule and containing from 0.7 to 0.8 weight percent of silicon-bonded hydrogen atoms, and 0.045 part of 2-methyl-3- butyn-2-ol. The second part was combined with 0.19 part of a reaction product of hexachloroplatinic acid and sym-tetramethyldivinyldisiloxane that had been diluted with a liquid dimethylsiloxy terminated polydimethylsiloxane in an amount sufficient to achieve a platinum content of 0.7 weight percent.

Equal parts of the two composition were combined, the resultant mixture placed between two parallel glass plates separated by distance of 0.25 cm and cured at a temperature of 150° C. in a hydraulic press. The resultant composite was evaluated for optical transmittance and haze using a model XL211 Hazeguard, manufactured by the Gardner Neotech Division of Pacific Scientific Corporation.

TABLE I

| Sample No. | 1* | 2 | 3 |
|---|---|---|---|
| Ingredient E (1st Addition) | 15 Pts. | 12 Pts. | 9 Pts. |
| Ingredient E (2nd Addition) | 0 Pts. | 3 Pts. | 6 Pts. |
| % Haze | 49-52 | 27-31 | 20-14 |
| % Transmittance | 82.5 | 83 | 83.5 |

*comparative example

The data in the table demonstrate the substantial increase in optical clarity, i.e. reduction in the % haze value, achieved as the amount of hexamethyldisilazane added during the second addition increased from 0 to 3 to 6 parts.

EXAMPLE II

This example discloses a preferred embodiment of the present method during which the ingredients are blended under high shear.

Polyorganosiloxane compositions were prepared and evaluated using the ingredients and general procedures described in Example I, with the exception that 21 parts of ingredient (A) and 33 parts of ingredient (B) were added following the silica addition and a Neulinger mixer equipped with three rotating blades was used in place of the dough type mixer. The dissolver blade of the mixer rotated at a speed of 80 revolutions per minute and the agitator blade rotated at a speed of 10 revolutions per minute and the third blade was designed remove material from the wall of the container and return it to the central portion of the composition. The ingredients were added in the same order described in Example I. Nine parts of hexamethyldisilazane were added initially and the remainder six parts were added following completion of the silica addition.

The resultant composition was cooled and divided into two equal parts. One of the parts was combined with 2.66 parts of a trimethylsiloxy endblocked polyorganosiloxane having an average of five methylhydrogensiloxane units and three dimethylsiloxane units per molecule and containing from 0.7 to 0.8 weight percent of silicon-bonded hydrogen atoms, and 0.045 part of 2-methyl-3- butyn-2-ol. The second part was combined with 0.19 part of a reaction product of hexachloroplatinic acid and sym-tetramethyldivinyldisiloxane that had been diluted with a liquid dimethylsiloxy terminated polydimethylsiloxane in an amount sufficient to achieve a platinum content of 0.7 weight percent.

The final composition of each sample together with the haze and transmittance values are recorded in the accompanying Table II.

TABLE II

| Sample No. | 4 |
|---|---|
| Ingredient A (Pts.) | 67 |
| Ingredient B (Pts.) | 33 |
| Water (Pts.) | 1.9 |
| Ingredient C (Pts.) | 1.2 |
| Silica (Pts.) | 35.0 |
| Ingredient E (Pts.) | 15.0 |
| Percent Haze | 5.23 |
| Percent Transmittance | 84.8 |

These data demonstrate that the optical clarity of the samples improved as shearing forces to which the composition was subjected during processing were increased That which is claimed is:

1. A method for preparing an optically clear, curable polyorganosiloxane composition, said method comprising the steps of
   I. blending to homogeniety a first mixture comprising at least one polydiorganosiloxane which contains a least two groups, per molecule, that will react with a curing agent, from 10 to 100 percent by weight, based on the weight of said polydiorganosiloxane, of an untreated reinforcing silica filler, and as a filler treating agent, at least 15 percent by weight, based on the weight of said filler, of a hexaorganodisilazane that is miscible with said polydiorganosiloxane;
   II. subsequently blending said first mixture with an additional quantity of said hexaorganodisilazane equal to at least 5 percent of the weight of said filler to form a second mixture, where the total weight of hexaorganodisilazane used to treat said filler is at least 30 percent of the weight of said filler; and
   III. heating said second mixture under reduced pressure to remove volatile materials and form said polyorganosiloxane composition.

2. A method according to claim 1, where said hexaorganodisilazane is represented by the formula R₃SiN(H)SiR₃, and said polydiorganosiloxane is represented by the average general formula

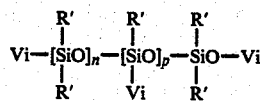

where each R and R' represents a monovalent hydrocarbon radical containing from 1 to 20 carbon atoms or a monovalent halohydrocarbon radical containing from 1 to 20 carbon atoms, Vi represents a vinyl radical, the sum of n and p represents a degree of polymerization equivalent to a viscosity of from 1 to about 50 Pa.s at 25 degree C. and p represents a value such that −p/(n+p) is equal to from 0.0 to 0.005, total amount of hexaorganodisilazane used to treat said filler is from 40 to 55 percent, based on the weight of said filler, said filler is a precipitated or fume silica and, in step II, said first mixture is blended with from 15 to 40 percent, based on filler weight, of hexaorganodisilazane.

3. A method according to claim 2 wherein the R radicals are identical and represent alkyl radicals containing from 1 to 4 carbon atoms or 3,3,3-trifluoropropyl radicals, the R' radicals contain from 1 to 10 carbon atoms and the filler constitutes from 20 to 50 percent by weight of said composition.

4. A method according to claim 3 where R represents methyl and at least 50 percent of the R' radicals° are methyl, with any remainder being phenyl or 3,3,3-trifluoropropyl.

5. A method according to claim 4 where R' represents methyl, said composition includes two polydiorganosiloxanes, the first of which exhibits a viscosity at 25° C. of from 0.1 to 3 Pa.s, and the second of which exhibits a viscosity at 25° C. of from 20 to 40 Pa.s. and said composition includes at least one auxiliary filler treating agent selected from the group consisting of liquid hydroxyl terminated polydimethylsiloxanes and liquid hydroxyl terminated dimethylsiloxane/methylvinylsiloxane copolymers.

6. A method according to claim 2 where said mixture is subjected to shearing forces during the blending operation by being in contact with a mechanically driven stirring blade operated at a speed of at least 80 revolutions per minute.

7. A method according to claim 5 where the viscosity of said curable composition is from 200 to 10,000 Pa.s at 25° C.

8. A method according to claim 1 where said composition is subsequently blended with an organohydrogensiloxane containing at least 3 silicon bonded hydrogen atoms per molecule and a platinum-containing hydrosilation catalyst.

9. A method according to claim 1 where said composition is subsequently blended with an organic peroxide.

10. A method according to claim 1 where the silica filler is initially treated with the hexaorganodisilazane in the presence of said polydiorganosiloxane.

* * * * *